US011074542B2

(12) United States Patent
Munafo et al.

(10) Patent No.: US 11,074,542 B2
(45) Date of Patent: Jul. 27, 2021

(54) AUTOMATED DELIVERY DEVICE AND METHOD FOR DELIVERING A PACKAGE

(71) Applicant: Intel Corporation, Santa Clara, CA (US)

(72) Inventors: Tamir Damian Munafo, Naale (IL); Adoni Mohammed Ghouse, Folsom, CA (US); Ariel Malamud, Jerusalem (IL); Johannes Berg, Detmold (DE); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 16/143,534

(22) Filed: Sep. 27, 2018

(65) Prior Publication Data

US 2019/0050805 A1    Feb. 14, 2019

(51) Int. Cl.
*G06Q 10/08* (2012.01)
*B64C 39/02* (2006.01)
*G08G 5/00* (2006.01)
*B64F 1/00* (2006.01)
*B64F 1/32* (2006.01)
*G05D 1/00* (2006.01)

(52) U.S. Cl.
CPC ....... *G06Q 10/0833* (2013.01); *B64C 39/024* (2013.01); *B64F 1/00* (2013.01); *B64F 1/32* (2013.01); *G08G 5/0013* (2013.01); *G08G 5/0026* (2013.01); *G08G 5/0069* (2013.01); *B64C 2201/127* (2013.01); *B64C 2201/128* (2013.01); *B64C 2201/145* (2013.01); *G05D 1/0022* (2013.01)

(58) Field of Classification Search
CPC .............. G06Q 10/0833; B64C 39/024; B64C 2201/127; B64C 2201/128; B64C 2201/145; B64F 1/00; B64F 1/32; G08G 5/0013; G08G 5/0026; G08G 5/0069; G05D 1/0022
See application file for complete search history.

(56) References Cited

U.S. PATENT DOCUMENTS

| 9,120,485 B1* | 9/2015 | Dolgov ................. B60W 30/10 |
| 9,194,168 B1* | 11/2015 | Lu ........................... B60R 25/24 |
| 9,244,147 B1* | 1/2016 | Soundararajan ... G06Q 10/0833 |
| 9,300,581 B1* | 3/2016 | Hui ....................... H04W 72/10 |

(Continued)

OTHER PUBLICATIONS

J.Kim, "Feasibility of employing a smartphone as the payload in a photogrammetric UAV system", published by Elsevier, on Mar. 8, 2013 (Year: 2013).*

(Continued)

*Primary Examiner* — Omar Zeroual
(74) *Attorney, Agent, or Firm* — Viering, Jentschura & Partner MBB (57) ABSTRACT

According to various examples, an automated delivery device is described including a transportation system configured to move a package to a package recipient location, a package drop-off mechanism configured to drop off the package at the package recipient location, a communication system configured to communicate with a recipient camera device at the package recipient location and a controller configured to instruct the recipient camera device via the transceiver to verify package delivery based on an image of the delivered package.

17 Claims, 11 Drawing Sheets

(56) References Cited

U.S. PATENT DOCUMENTS

| | | | |
|---|---|---|---|
| 9,547,309 B2* | 1/2017 | Ross | G06Q 50/30 |
| 9,646,356 B1* | 5/2017 | Schwie | G05D 1/0088 |
| 9,741,010 B1* | 8/2017 | Heinla | G06Q 10/083 |
| 9,791,291 B1* | 10/2017 | Yamashita | H04L 41/22 |
| 9,813,510 B1* | 11/2017 | Nickels | H04L 41/5019 |
| 9,892,379 B1* | 2/2018 | Danyluk | G08B 13/19695 |
| 10,102,758 B1* | 10/2018 | Beaurepaire | G06Q 10/08355 |
| 10,131,437 B1* | 11/2018 | Hanlon | G06Q 10/083 |
| 10,192,387 B2* | 1/2019 | Brinig | G06K 7/1417 |
| 10,222,799 B2* | 3/2019 | Goldberg | G05D 1/0088 |
| 10,249,200 B1* | 4/2019 | Grenier | G05D 1/0088 |
| 10,268,192 B1* | 4/2019 | Wengreen | G05D 1/0088 |
| 10,286,908 B1* | 5/2019 | Wengreen | B60W 30/0956 |
| 10,310,499 B1* | 6/2019 | Brady | G06Q 10/087 |
| 10,366,290 B2* | 7/2019 | Wang | H04L 67/12 |
| 10,417,727 B2* | 9/2019 | Yamashita | G06F 3/04842 |
| 10,493,952 B1* | 12/2019 | Schwie | E05F 15/72 |
| 10,495,471 B2* | 12/2019 | Sweeney | G01C 21/3438 |
| 10,501,091 B2* | 12/2019 | Kislovskiy | H04W 4/44 |
| 10,537,195 B1* | 1/2020 | Giles | A47G 29/20 |
| 10,654,411 B2* | 5/2020 | O'Herlihy | H04L 67/12 |
| 2006/0136236 A1* | 6/2006 | Horton | G06Q 99/00 705/330 |
| 2013/0231824 A1* | 9/2013 | Wilson | G01C 21/3415 701/26 |
| 2014/0108136 A1* | 4/2014 | Zhao | G06Q 10/0833 705/14.49 |
| 2014/0164126 A1* | 6/2014 | Nicholas | G06Q 30/08 705/14.58 |
| 2014/0350855 A1* | 11/2014 | Vishnuvajhala | G08G 1/144 701/538 |
| 2015/0120094 A1* | 4/2015 | Kimchi | G05D 1/00 701/3 |
| 2015/0156031 A1* | 6/2015 | Fadell | G08B 19/005 700/276 |
| 2015/0199619 A1* | 7/2015 | Ichinose | G01C 21/3469 705/5 |
| 2015/0301150 A1* | 10/2015 | Stuckman | G01S 1/00 342/407 |
| 2015/0347959 A1* | 12/2015 | Skaaksrud | H04W 8/24 705/333 |
| 2016/0068264 A1* | 3/2016 | Ganesh | B64C 39/024 701/2 |
| 2016/0104098 A1* | 4/2016 | Matula | H04L 61/6022 701/23 |
| 2016/0104113 A1* | 4/2016 | Gorlin | G06Q 10/08355 705/338 |
| 2016/0185466 A1* | 6/2016 | Dreano, Jr. | G06Q 30/0635 705/26.81 |
| 2016/0189098 A1* | 6/2016 | Beaurepaire | H04W 12/084 705/337 |
| 2016/0189101 A1* | 6/2016 | Kantor | G08G 5/0026 705/338 |
| 2016/0195602 A1* | 7/2016 | Meadow | G01S 5/10 701/517 |
| 2016/0209220 A1* | 7/2016 | Laetz | G08G 1/202 |
| 2016/0235236 A1* | 8/2016 | Byers | A47G 29/141 |
| 2016/0247106 A1* | 8/2016 | Dalloro | G06Q 10/06313 |
| 2016/0264021 A1* | 9/2016 | Gillett | B60K 37/06 |
| 2016/0301698 A1* | 10/2016 | Katara | H04L 63/102 |
| 2016/0364812 A1* | 12/2016 | Cao | G06Q 50/30 |
| 2017/0012697 A1* | 1/2017 | Gong | B64C 39/024 |
| 2017/0068872 A1* | 3/2017 | Short | G06K 9/6288 |
| 2017/0091710 A1* | 3/2017 | Van Dyke | H04L 67/42 |
| 2017/0091711 A1* | 3/2017 | Akselrod | B64C 39/024 |
| 2017/0091856 A1* | 3/2017 | Canberk | G06Q 30/0609 |
| 2017/0147975 A1* | 5/2017 | Natarajan | G05D 1/0676 |
| 2017/0147976 A1* | 5/2017 | Koch | G06Q 10/0836 |
| 2017/0161561 A1* | 6/2017 | Marty | H04N 5/23238 |
| 2017/0220872 A1* | 8/2017 | Child | G08B 13/196 |
| 2017/0286892 A1* | 10/2017 | Studnicka | G06Q 20/204 |
| 2017/0293301 A1* | 10/2017 | Myslinski | G06Q 50/01 |
| 2017/0300757 A1* | 10/2017 | Wolf | G06K 9/0063 |
| 2017/0301200 A1* | 10/2017 | Siminoff | G08B 13/19619 |
| 2017/0320569 A1* | 11/2017 | Gordon | B64C 39/024 |
| 2017/0323545 A1* | 11/2017 | Gillen | G06Q 50/30 |
| 2017/0336203 A1* | 11/2017 | Barnes | G01C 11/34 |
| 2017/0355076 A1* | 12/2017 | Gordon-Carroll | B25J 11/008 |
| 2017/0359554 A1* | 12/2017 | Madhav | H04N 7/185 |
| 2018/0047267 A1* | 2/2018 | Modestine | G06T 7/13 |
| 2018/0060811 A1* | 3/2018 | Boesen | G01S 3/46 |
| 2018/0070753 A1* | 3/2018 | Eveloff | H04W 4/025 |
| 2018/0105289 A1* | 4/2018 | Walsh | B60L 53/51 |
| 2018/0107211 A1* | 4/2018 | Schubert | G08G 5/0026 |
| 2018/0130017 A1* | 5/2018 | Gupte | G01N 33/00 |
| 2018/0144302 A1* | 5/2018 | Murray | G06K 9/00885 |
| 2018/0155032 A1* | 6/2018 | Gil | G08G 5/0069 |
| 2018/0203464 A1* | 7/2018 | Yu | B60P 3/007 |
| 2018/0217594 A1* | 8/2018 | Greenberger | G06Q 50/10 |
| 2018/0234902 A1* | 8/2018 | Talbert | H04W 24/02 |
| 2018/0285653 A1* | 10/2018 | Li | G06K 9/00335 |
| 2018/0322775 A1* | 11/2018 | Chase | G06N 5/003 |
| 2018/0357909 A1* | 12/2018 | Eyhorn | G08G 5/0013 |
| 2019/0012625 A1* | 1/2019 | Lawrenson | G06Q 50/12 |
| 2019/0012640 A1* | 1/2019 | Ferguson | G05D 1/0044 |
| 2019/0049988 A1* | 2/2019 | Meij | G05D 1/0274 |
| 2019/0061939 A1* | 2/2019 | Anand | G06Q 10/0835 |
| 2019/0066516 A1* | 2/2019 | Kuhara | G08G 1/202 |
| 2019/0095862 A1* | 3/2019 | Kilzer | G06Q 10/0836 |
| 2019/0122463 A1* | 4/2019 | Romero | G07C 9/00571 |
| 2019/0132613 A1* | 5/2019 | Jiao | H04L 65/4076 |
| 2019/0137290 A1* | 5/2019 | Levy | G01C 21/3461 |
| 2019/0220032 A1* | 7/2019 | Skorinko | G05D 1/0246 |
| 2019/0220811 A1* | 7/2019 | Naito | G06Q 10/08355 |
| 2019/0244448 A1* | 8/2019 | Alamin | G07C 9/20 |
| 2019/0265703 A1* | 8/2019 | Hicok | G06Q 50/30 |
| 2019/0279151 A1* | 9/2019 | Felice | H04N 7/185 |
| 2019/0279181 A1* | 9/2019 | Kelly | G06Q 20/202 |
| 2019/0287051 A1* | 9/2019 | Heinla | G06Q 10/083 |
| 2019/0303684 A1* | 10/2019 | Khadloya | G06K 9/00771 |
| 2019/0303861 A1* | 10/2019 | Mathias | B64C 39/024 |
| 2019/0343317 A1* | 11/2019 | Cantrell | A47G 29/1248 |
| 2019/0370740 A1* | 12/2019 | Brow | G07C 9/00896 |
| 2020/0017237 A1* | 1/2020 | Walker | B64F 1/007 |
| 2020/0056900 A1* | 2/2020 | Lee | G08G 5/0069 |
| 2020/0065931 A1* | 2/2020 | Engle | G08G 1/202 |
| 2020/0180759 A1* | 6/2020 | Harada | H04N 7/185 |

OTHER PUBLICATIONS

J. Andersson, "Real-time image processing on handheld devices and UAV", published by Linkopings Universitet, in Spring term 2016 (Year: 2016).*

* cited by examiner

AUTOMATED DELIVERY DEVICE AND METHOD FOR DELIVERING A PACKAGE

TECHNICAL FIELD

Exemplary implementations described herein generally relate to automated delivery devices and methods for delivering a package.

BACKGROUND

Today, package delivery goes largely untrusted. Manual delivery methods take on at least two forms: a recipient needs to be present at the time of delivery to sign and receive the package or a package can be delivered unattended to a specified location such as at the doorstep or to a designated neighbor, all based on recipient's instructions.

The highest level of trust attained in these scenarios are basically a physical signature collected by the shipper, which goes generally unchecked. At most, the signature is scanned and stored in the shipper's database.

Others methods include designated private 'delivery boxes' provided to the recipient by a shipper accessible by key, or a delivery box at the local post office accessible by a smartcard.

With the huge success of online ordering of products, shippers consider the usage of automated delivery of packages, for example by drones (e.g. Unmanned Aerial Vehicles (UAVs)). An issue that arises in this context is that shippers need to prove that a package has been successfully delivered to a customer. While human delivery personnel (e.g. a mailman) can testify that he has delivered a package, an automated delivery device such as a drone cannot do this. Accordingly, approaches are desirable which allow verification of delivery.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Exemplary embodiments of the present disclosure can be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may include one or more of a central processing unit (CPU), a microprocessing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)), a flash memory device, a memory card, and the like. By way of illustration, specific details and embodiments in which the invention may be practiced are described in the following.

Figure 1:
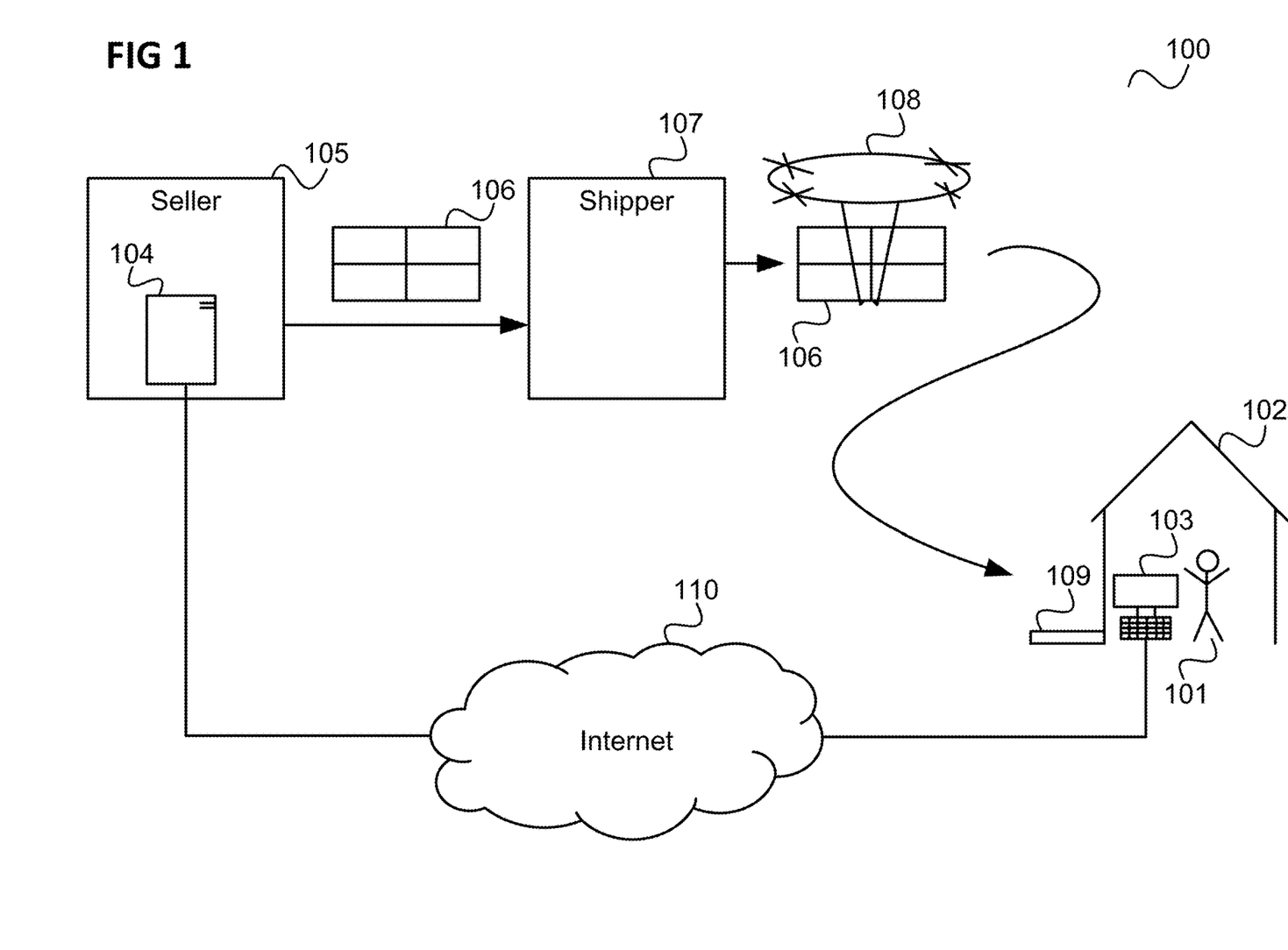
FIG. 1 shows a package ordering and delivery arrangement.

FIG. 1 shows a package ordering and delivery arrangement 100.

A user (customer) 101 living in this house 102 uses his computer 103 to connect to the server 104 of a seller 105. Typically, the server 104 hosts a website accessible via the Internet 110 to which the user 101 may connect using his computer 103 and where he may select a product and place an order for the product. The product is packed into a package 106 which is given to a shipper 107 which is tasked to deliver the package 106 to the user 101. The shipper 107 uses automated delivery by means of an automated delivery device 108, e.g. a drone, to deliver the package 106 to the user's doorstep 109.

The shipper 107, on behalf of the seller 105, can deliver the package 106 to the correct address of the user's house 102 even in an unattended scenario when using an autonomous system (i.e. the automated delivery device 108) delivering the package 106 to the customer's front door (doorstep 109) when the user (customer) 101 is not present to receive it.

However, this unattended delivery method is typically not trusted by either side. Neither the sender (shipper 107) nor the recipient (user 101) can positively identify each other. This can cause liability issues when, for example, the package 106 is delivered to the wrong location and/or the wrong recipient, or it is stolen or arrives damaged. In such cases whenever the delivery is unattended, it would be difficult to determine who is at fault—the shipper 107 or the customer 101. This can also cause shipper's reputation to be negatively affected.

According to various examples, a method and apparatus for trusted and reliable delivery are provided. A dispatching device (i.e. an automated delivery device 108) may be configured upon arrival to a drop-off point (e.g. doorstep 109), to collect evidence of delivery such as GPS location or photo (image), and to timestamp at the time and place of delivery and submit it to a delivery tracking system. A secure engine based on hardware (such as SGX (Software Guard Extensions), Trustzone, and a co-processor) may be used that collects the data directly from the sensor and signs it thus creating trust between the parties.

This digital trust approach allows securely authenticating two parties (delivery device and recipient) and may be used to establish a trusted relationship between seller 105, shipper 107 and recipient 101. The receiving side (user 101) is, in case of an issue, able to open a dispute and use the same approach for providing evidence of non-delivery, a broken package, etc. The digital trust approach can be used by both sides to ascertain and validate each side to ensure the intended and accurate origin and destination of the package. This allows fully automating the delivery process by utilizing an unmanned autonomous (or semi-autonomous) delivery system such as a drone, a robot, an automated smart car or combinations.

Figure 2:
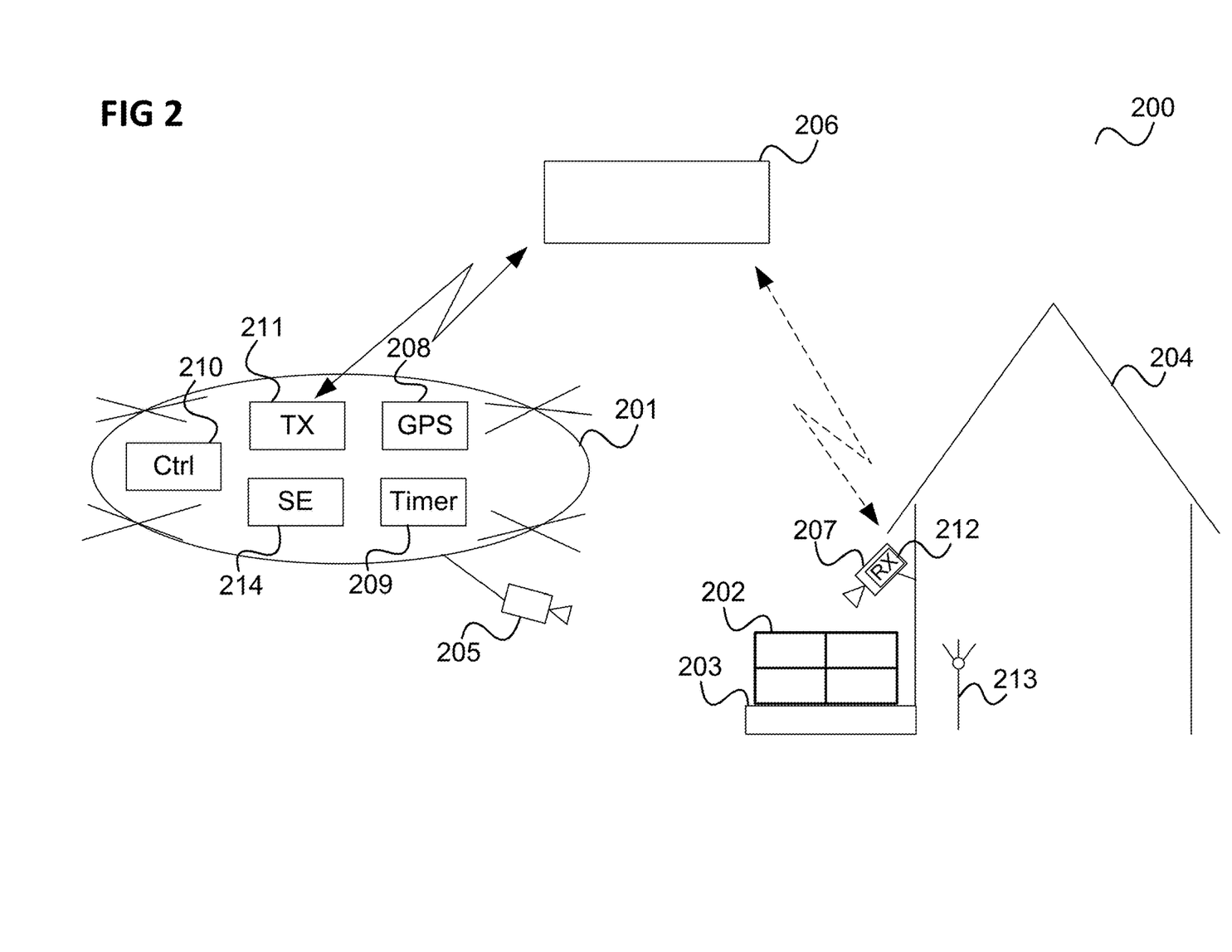
FIG. 2 shows an arrangement at a recipient's house according to various examples.

FIG. 2 shows an arrangement 200 at the recipient's house according to various examples.

An automated delivery device (dispatching device) 201, e.g. corresponding to automated delivery device 108 of FIG. 1, delivers a package 202 to a drop-off point, e.g. a doorstep 203 of a customer's house 204 corresponding to the doorstep 109 of FIG. 1.

The dispatching device 201 may be configured to travel to a location associated with a customer, e.g. a customer's house or residence 204. The dispatching device 201, upon arrival at the drop point 203, is further configured to collect evidence of the delivery of the package 202 such as GPS location and a timestamp at the time of delivery. The dispatching device 201 may collect the evidence electronically using hardware, software or both, e.g. using a GPS receiver and a clock. The dispatching device 201 may further be equipped with a camera 205 and be configured to take one or more photos (e.g., digital image(s)) of the delivered package 202. The dispatching device 201 is configured to deliver the evidence or data thereof, (possibly including the photo(s)/digital image(s)) through any suitable means (e.g., wireless communications) to a server 206 of the provider of the digital trust service.

The trust is gained by a secure engine 214 of the dispatching device which may be based on hardware (such as SGX, Trustzone, secure co-processor) that is configured to collect the evidence data directly from the corresponding sensors (GPS receiver 209, camera 205, timer 209) and signs it, e.g. using EPID (Enhanced Privacy ID).

The receiving side, i.e. the customer 101 can, in case of an issue, open a dispute and use a similar method for providing evidence of non-delivery or a broken package, etc. For this, the house 204 may be provided with a camera 207 configured to take a picture of the delivered package.

According to various examples, the camera 207 is used by the dispatching device 201 to strengthen the evidence that it gathers and provides to the server 206: A controller 210 of the dispatching device 201 may send a command via a transmitter 211 of the dispatching device 201 and a receiver 212 of the camera 207 which instructs the camera 207 to take a photo of the delivered package 202. The controller 210 may further instruct the camera 207 to upload this photo to the server 206 or to provide it to the dispatching device 201. In the latter case, the dispatching device 201 may itself upload the photo to the server 206. The controller 210 may for example include one or more microprocessors, microcontrollers or an FPGA (Field Programmable Gate Array) and may be configured to execute program instructions and operatively communicate with other components.

At the customer's location, there may also be provided a wireless ranging device 213 (e.g. a beacon device) that transmits a wireless beacon signal that allows the delivery device 201 to more accurately find the drop-off location 203. That is, the delivery device 201 may be configured to receive a signal from the beacon device in order to find the correct drop-off location.

Approaches according to various examples such as described with reference to FIG. 2 allow establishing a digital trust relationship between 105 seller, shipper 107 and recipient 101.

Figure 3:
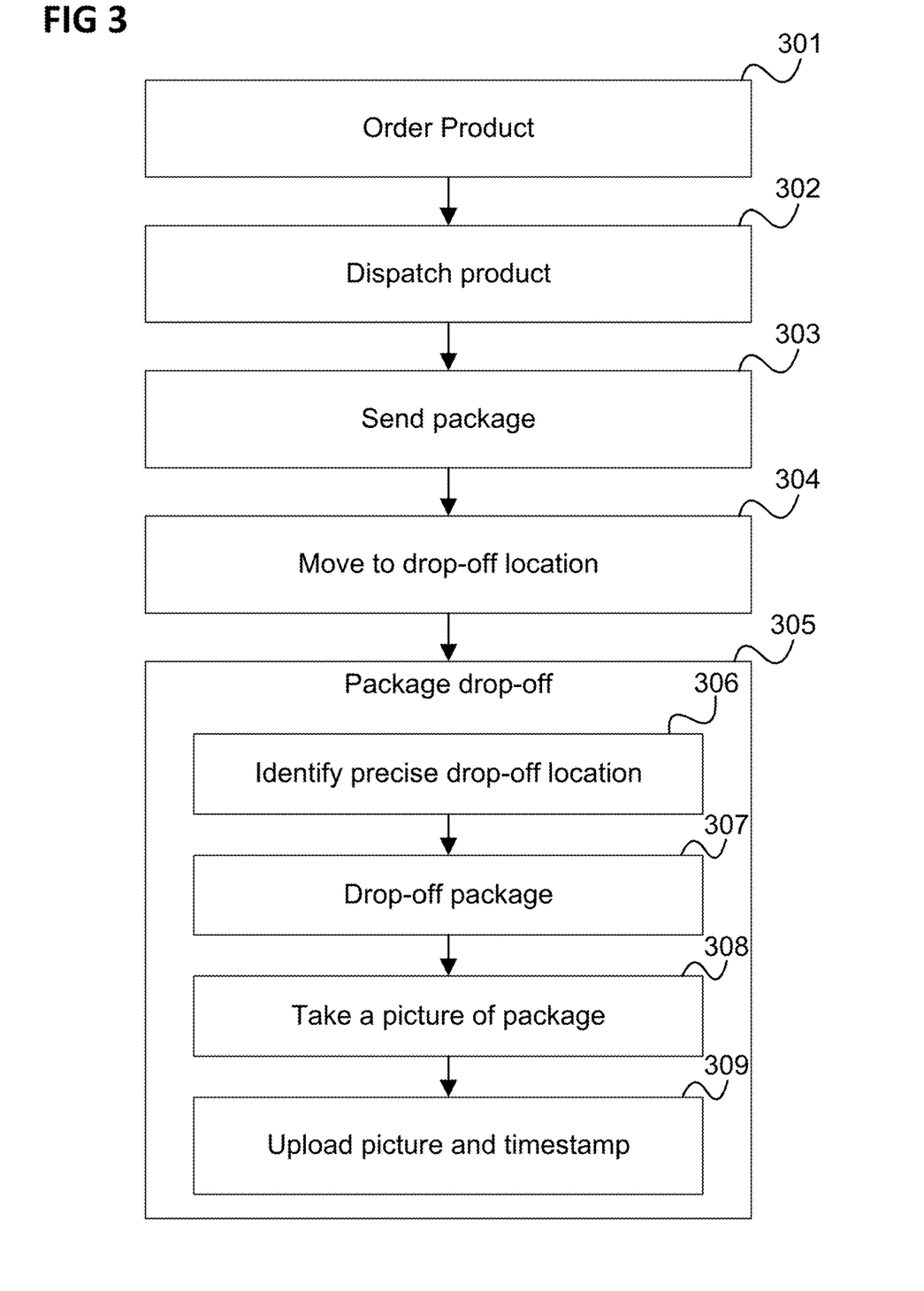
FIG. 3 illustrates a flow for establishing a digital trust relationship between seller, shipper and recipient according to an example.

FIG. 3 illustrates a flow for establishing a digital trust relationship between seller, shipper and recipient according to an example.

In 301, the recipient 101 orders a product from the seller 105.

In 302, the seller 105 dispatches the product via the shipper 107.

In 303, the shipper 107 sends package with the product via the automated delivery device 108, e.g. a UAV (unmanned aerial vehicle).

In 304, the delivery device 108 approaches the recipient's location (e.g. the customer's house 102) via GPS.

In 305, the delivery device 108 performs the package drop-off and authentication process. In this example, it is assumed that there is no active device (such as camera 112) at the recipient's house 102. The process of 305 includes 306 to 309 as follows:

In 306, the delivery device 108 identifies precise drop-off location (more precise than GPS, e.g. the customer's doorstep 109) using, for example, optical recognition (e.g. based on a QR) or a camera-based identification of physical premises (building, patio, yard, etc.) based on one or more recipient-provided reference images. The delivery device may also identify the precise drop-off location (more precise than GPS, e.g. the doorstep 203) using the wireless ranging device 213.

In 307, the delivery device 108 drops off the package (e.g. a parcel) 106.

In 308, the delivery device 108 takes a picture of the package 106 by means of its camera 205. The image or picture, in addition to capturing the package, may capture other identifiable aspects associated with the address or residence of the recipient.

In 309, the delivery device 108 digitally signs the picture and timestamp information of the delivery time (e.g. using EPID as a key to encrypt) and uploads it through any suitable communication means to server 206 (e.g. in a cloud).

Figure 4:
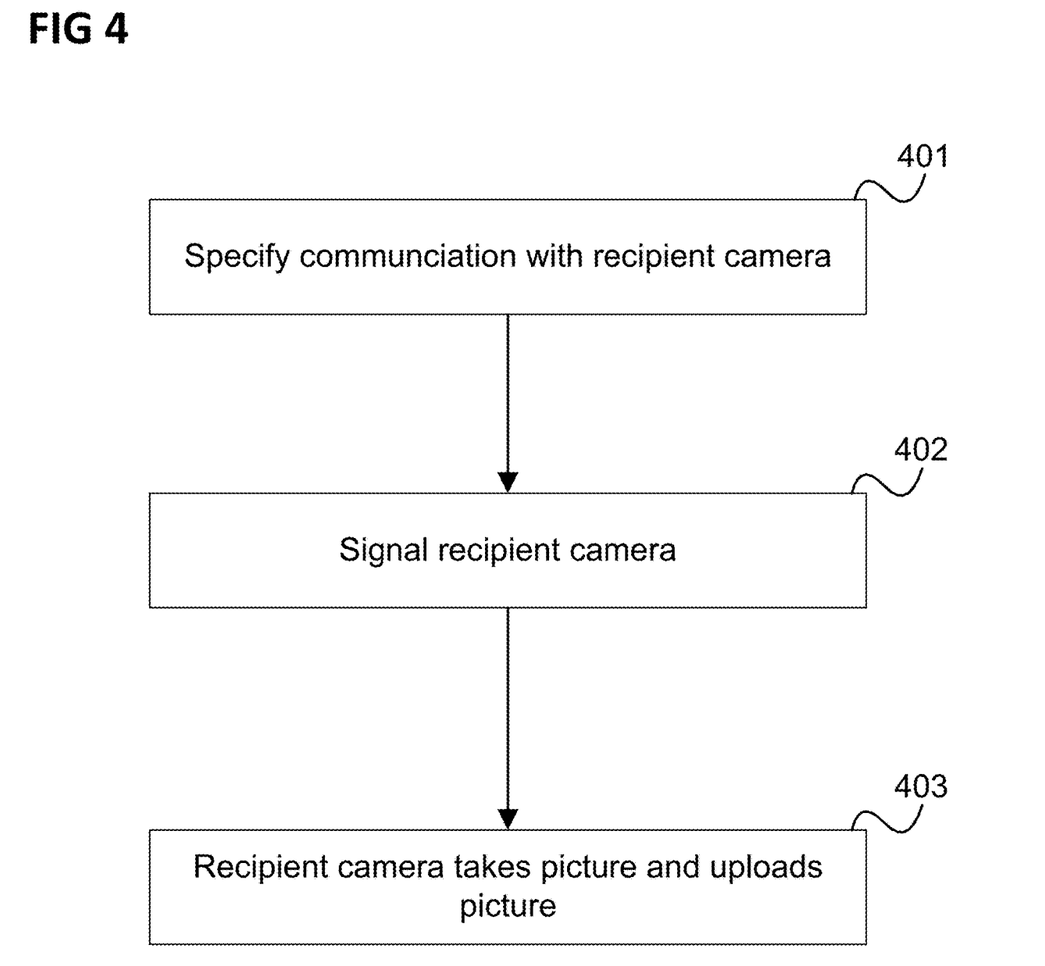
FIG. 4 illustrates a flow for establishing a digital trust relationship between seller, shipper and recipient according to another example.

FIG. 4 illustrates a flow for establishing a digital trust relationship between seller, shipper and recipient according to another example.

In this example, it is assumed that both the delivery device 201 and the drop-off location 204 have their own camera 205, 212, i.e. there is also an on-premise camera.

The following may be carried out in addition to 301 to 309 of FIG. 3.

In 401, at the time of the order, the recipient 101 specifies a way for the delivery device 108 to communicate with the camera 212 at the recipient's location. For example, such a mechanism could use a Bluetooth device address to identify the camera 212. Alternatively, Infrared communication may be used.

In 402, when the delivery device 108 has dropped-off the package 106, it signals the recipient's camera 212.

In 403, the recipient's camera 212, in response, also takes a picture of the delivered package, digitally signs the picture and timestamp information specifying the time of the picture and uploads it to the server 206.

Figure 5:
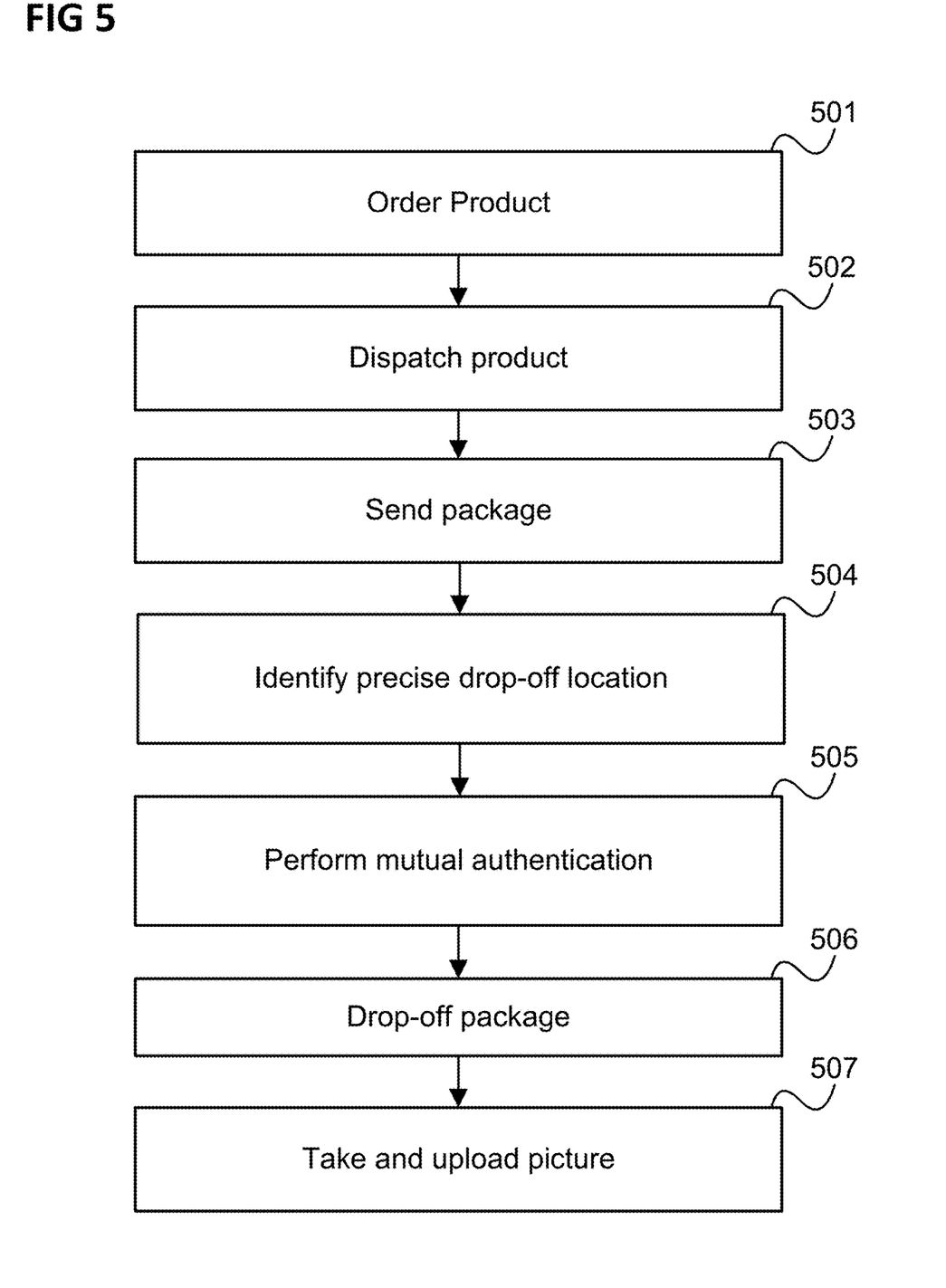
FIG. 5 illustrates a flow for establishing a digital trust relationship between seller, shipper and recipient according to another example.

FIG. 5 illustrates a flow for establishing a digital trust relationship between seller, shipper and recipient according to another example.

In this example, a full mutual authentication is carried out.

In 501, the recipient 101 orders a product from the seller 105.

In 502, the seller 105 dispatches the product via the shipper 107.

In 503, the shipper 107 sends package via the automated delivery device 108, 201, e.g. a UAV.

In 504, the delivery device 201 identifies the precise drop-off location (more precise than GPS, e.g. the doorstep 203) using the wireless ranging device 213. The customer may provide information identifying the wireless ranging device 213 at the time of order in 501. That is, the customer may electronically transmit the information identifying the wireless ranging device 213 which is electronically communicated to the delivery device 201.

For example, the delivery device 201 may use Wi-Fi based FTM (Fine Timing Measurement) according to IEEE, with the delivery device 201 being the initiator, and one or more responders located at the recipient's site (corresponding to one or more wireless ranging devices 213). In this case, the information identifying the wireless ranging device 213 would e.g. be the BSSID (Basic Service Set Identifier) and/or the SSID (Service Set Identifier).

In 505, the delivery device 201 and the wireless ranging device 213 mutually authenticate each other using a trust relationship established at the time of sale or shipment, for example. For example, at the time of sale 501, a token (such as a random passphrase) is assigned for this transaction and distributed to both the delivery device 201 and the wireless ranging device 213, e.g. by the server 206. For example, the delivery device 201 and the wireless ranging device 213 can mutually verify this token using the SAE (Secure Authentication of Equals) Wi-Fi protocol. Both can verify each other's possession of the Token, and can also use it to exchange temporal keys for further secure communications if necessary. An authentication handshake can use the same Wireless Radio used for the Wireless Ranging of 504. For example, in the case of Wi-Fi based FTM, the delivery device 201 could use the same FTM responder's Wi-Fi radio for communication.

It should be noted that a continuous output of the wireless ranging device 213 can be used to geo-fence the authentication to prevent a situation where the delivery device 201 is in wireless range of the wireless ranging device 213 but in the wrong location or too far away from the recipient due to errors or attacks in 504. For example, an attacker could fake an unauthenticated high-power ranging signal and turn it off with the beginning of authentication in 505, resulting in authentication succeeding with the correct wireless ranging device 213 within wireless range but in a different unintended drop-off location.

In 506, the delivery device 201 drops off the package 202 at the precise intended and authenticated location.

In 507, optionally, one or both sides take one or more pictures of the delivered package 202, embed the ranging information and authentication results into the picture's metadata, and send it to the server 206 (e.g. acting as a Trusted Electronic Notary) as proof of delivery and damage identification. On the customer's side, this may be performed by a system including the camera 212 and/or the wireless ranging device 213.

Figure 6:
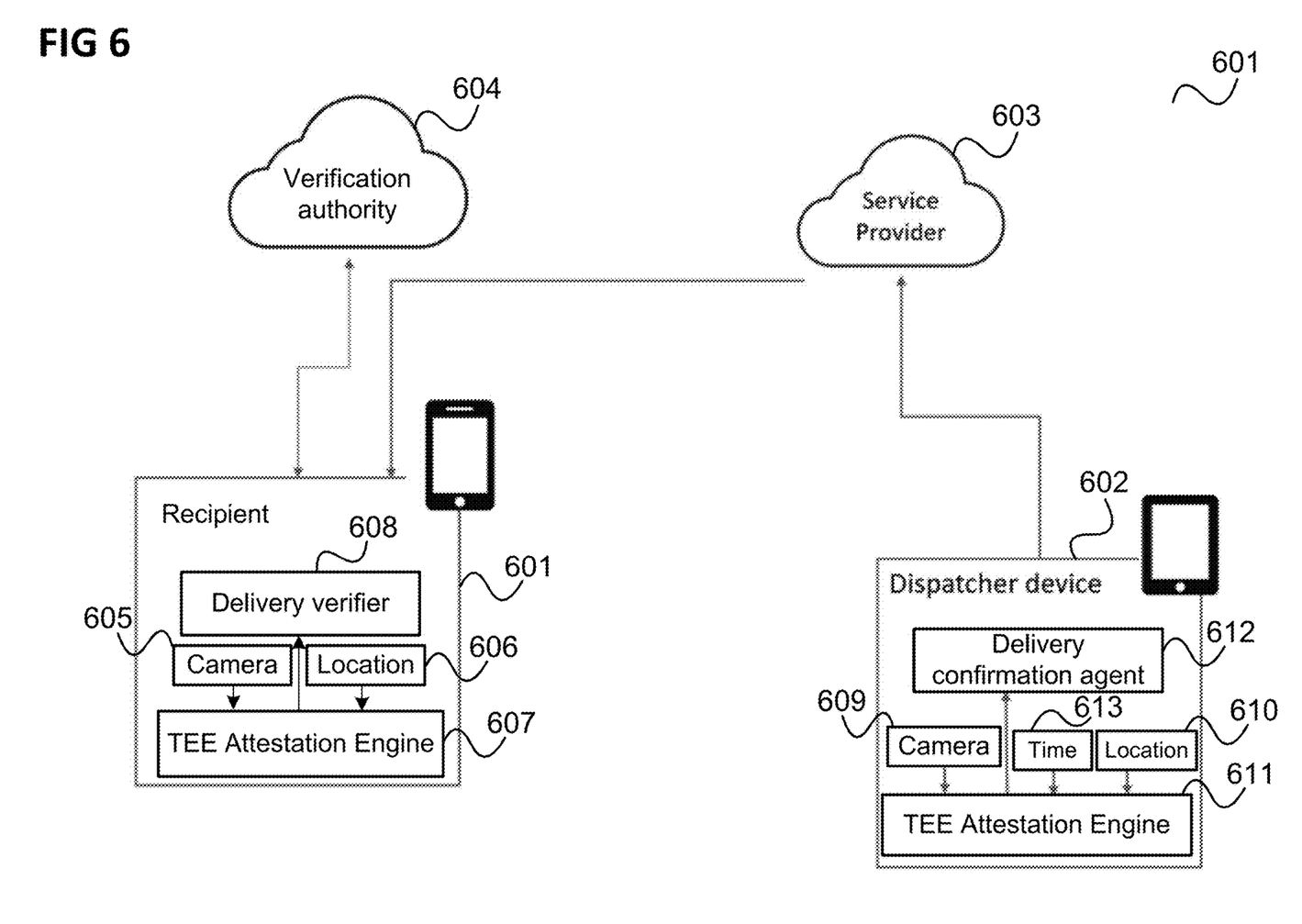
FIG. 6 shows an arrangement for trusted delivery of packages.

The delivery device 201 and the customer's system may would follow the processing of SGX (Trusted Execution Environment) as illustrated in FIG. 6 to sign the picture, timestamp and location information to securely communicate with the server 206.

FIG. 6 shows an arrangement 600 for trusted delivery of packages.

The arrangement 600 includes a recipient device 601, for example corresponding to the customer's system including camera 212 and wireless ranging device 213, a dispatching device 602, for example corresponding to the delivery device 201, a service provider's server 603, for example corresponding to the server 206 and a verification authority 604.

The recipient device 601 has a camera 605 and a positioning device 606 providing its location. Further, the recipient device 601 has a TEE (Trusted Execution Environment) attestation engine 607 and a delivery verifier 608.

The camera 605 provides an image of a delivered package to the TEE attestation engine 607 and the positioning device 606 gives an indication of the position of the recipient device 601 at the time of taking the image to the TEE attestation engine 607.

The TEE attestation engine 607 checks and validates the delivery verifier 608, e.g. software running on the recipient device 601 implementing the delivery verifier 608, and the delivery verifier 608 transmits the image and the indication of the position of the recipient device 601 to the service provider 603. The TEE attestation engine 607 may be implemented by a secure root of the TEE attestation engine 607 which may be verified by the verification authority 604.

Similarly, the dispatching device 602 has a camera 609, a positioning device 610 providing its location, a TEE (Trusted Execution Environment) attestation engine 611 and a delivery confirmation agent 612. Furthermore, the dispatching device 602 has in this example a timer 113.

The camera 609 provides an image of a delivered package to the TEE attestation engine 611 and the positioning device 610 gives an indication of the position of the recipient device 602 at the time of taking the image to the TEE attestation engine 611. The timer provides an indication of this time to the TEE attestation engine 611.

The TEE attestation engine 611 checks and validates the delivery confirmation agent 612, e.g. software running on the recipient device 602 implementing the delivery confirmation agent 612, and the delivery confirmation agent 612 transmits the image and the indications of the position of the recipient device 601 and the time to the service provider 603.

Figure 7:
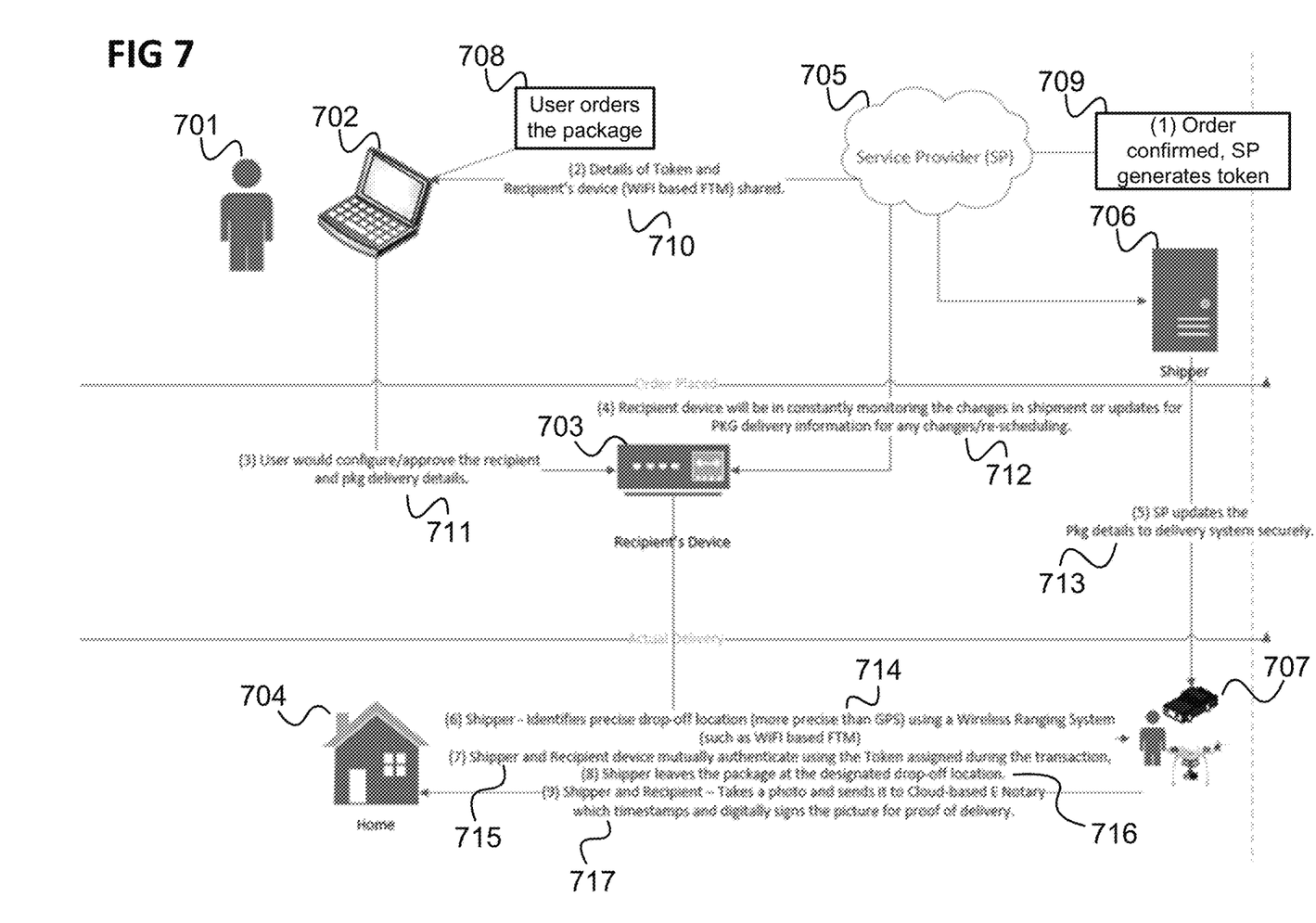
FIG. 7 illustrates an example of the approach of establishing a digital trust relationship of FIG. 5.

FIG. 7 illustrates an example of the approach of establishing a digital trust relationship of FIG. 5.

The example involves a user 701 having a computer 702, a recipient device 703 and a home 704, a service provider 705, a shipper 706 and a delivery device 707. In this example, the service provider 705 providing the service of establishing trust of delivery is also the seller.

In 708, the user 701 orders a package from the service provider 705 (seller).

In 709, the service provider 705 confirms the order and generates a token (e.g. a random passphrase).

In 710 the user's computer 702 and the service provider 705 share details about the token as well as about the recipient device 703 (e.g. its support of WiFi based FTM and corresponding details).

In 711, the user 701 approves or sets the recipient and package delivery details and configures the recipient device 703 accordingly.

In 712, the recipient device 703 constantly monitors changes in the shipment or updates package delivery information for any changes or re-scheduling.

In 713, the service provider provides package details (such as delivery address) to the delivery device 707 by means of the shipper 706.

In 714, the delivery device 707 identifies the precise drop-off location (with higher precision than provided by GPS) using a wireless ranging system (such as WiFi based FTM).

In 715, the delivery device 707 and the recipient device 703 mutually authenticate themselves using the token assigned with the order.

In 716, the shipper leaves the package at the drop-off location.

In 717, the delivery device 707 and the recipient device 703 take a photo of the delivered package and send it to a cloud-based E-notary (e.g. provided by the service provider 705) which timestamps and digitally signs the pictures for proof of delivery.

Figure 8:
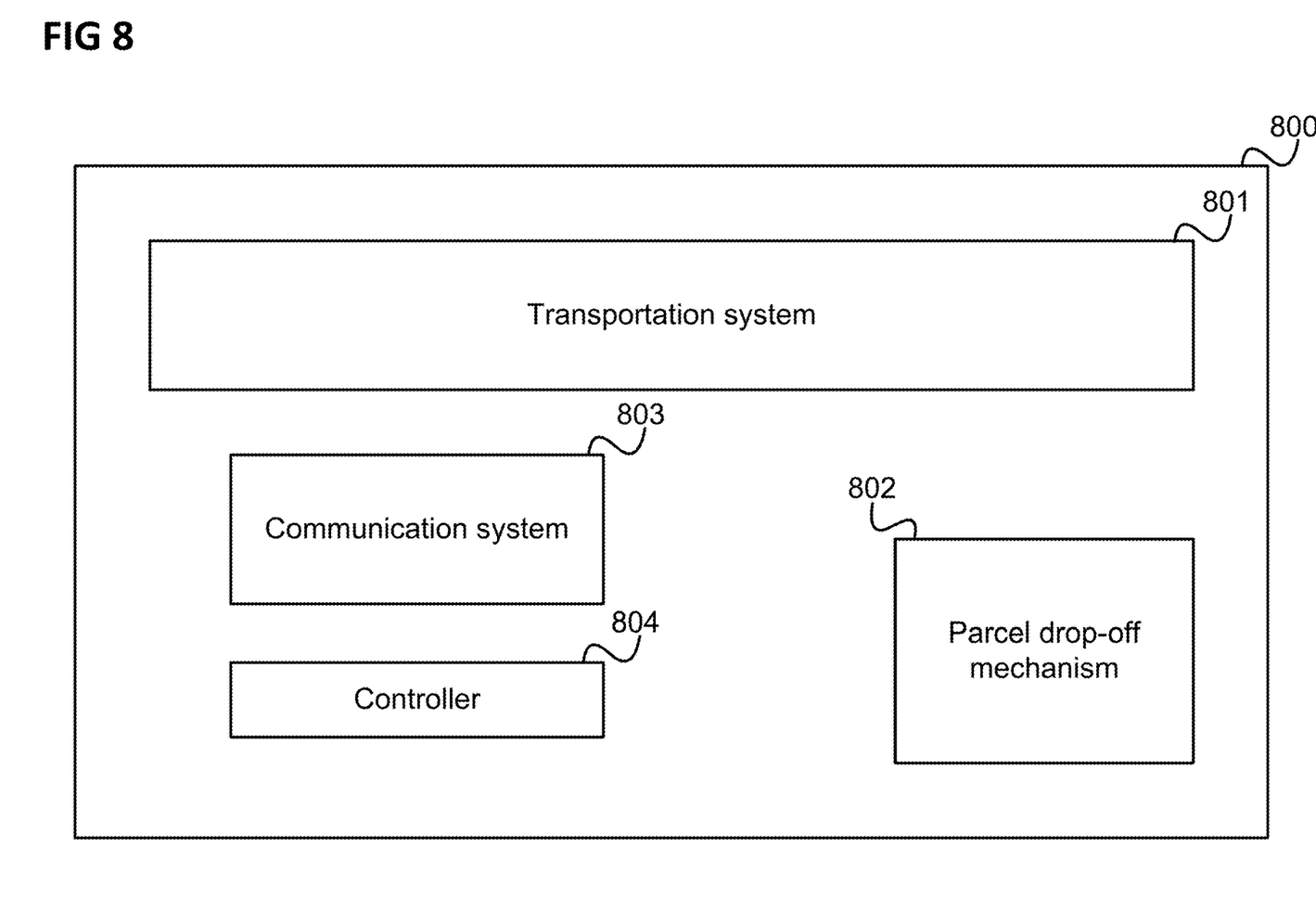
FIG. 8 shows an automated delivery device.

In summary, according to various examples, an automated delivery device is provided as illustrated in FIG. 8.

FIG. 8 shows an automated delivery device 800.

The automated delivery device 800 includes a transportation system 801 configured to move a package to a package recipient location and a package drop-off mechanism 802 configured to drop off the package at the package recipient location.

Further, the automated delivery device 800 includes a communication system 803 configured to communicate with a recipient camera device at the package recipient location and a controller 804 configured to instruct the recipient camera device via the transceiver to verify package delivery based on an image of the delivered package.

According to various examples, in other words, an automated (and typically unmanned) delivery device, such as a drone or generally a robot, instructs a camera at a drop-off point to take a photo of the delivered package (i.e. package) to verify delivery of the package. The camera at the drop-off point may electronically provide the photo to the automated delivery device or may itself electronically provide the photo to a delivery verification entity such as a server of a service provider providing a delivery verification service.

The transportation system may include one or more rotors, wheels, tracks etc.

The components of the automated delivery device (e.g. the communication system, and the controller) may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The communication system may for example be at least partially be implemented by a transceiver which may for example be at least partially implemented by a modem, a baseband processor or other transceiver components or also by an application processor.

Figure 9:
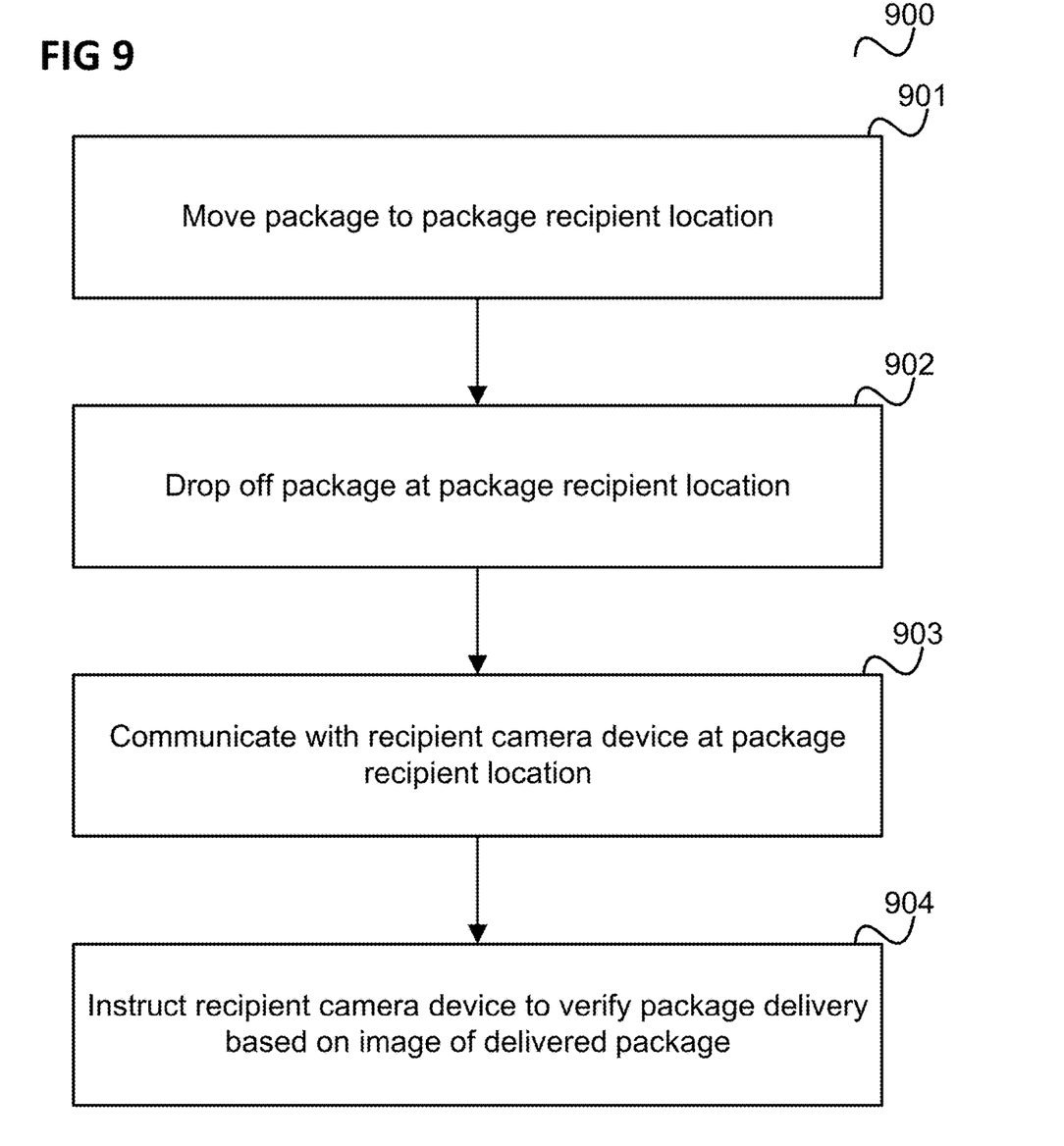
FIG. 9 shows a flow diagram illustrating a method for delivering a package, for example performed by an automated delivery device.

FIG. 9 shows a flow diagram 900 illustrating a method for delivering a package, for example performed by an automated delivery device.

In 901, the automated delivery device moves a package to a package recipient location.

In 902, the automated delivery device drops off the package at the package recipient location.

In 903, the automated delivery device communicates with a recipient camera device at the package recipient location.

In 904, the automated delivery device instructs the recipient camera device to verify package delivery based on an image of the delivered package.

Figure 10:
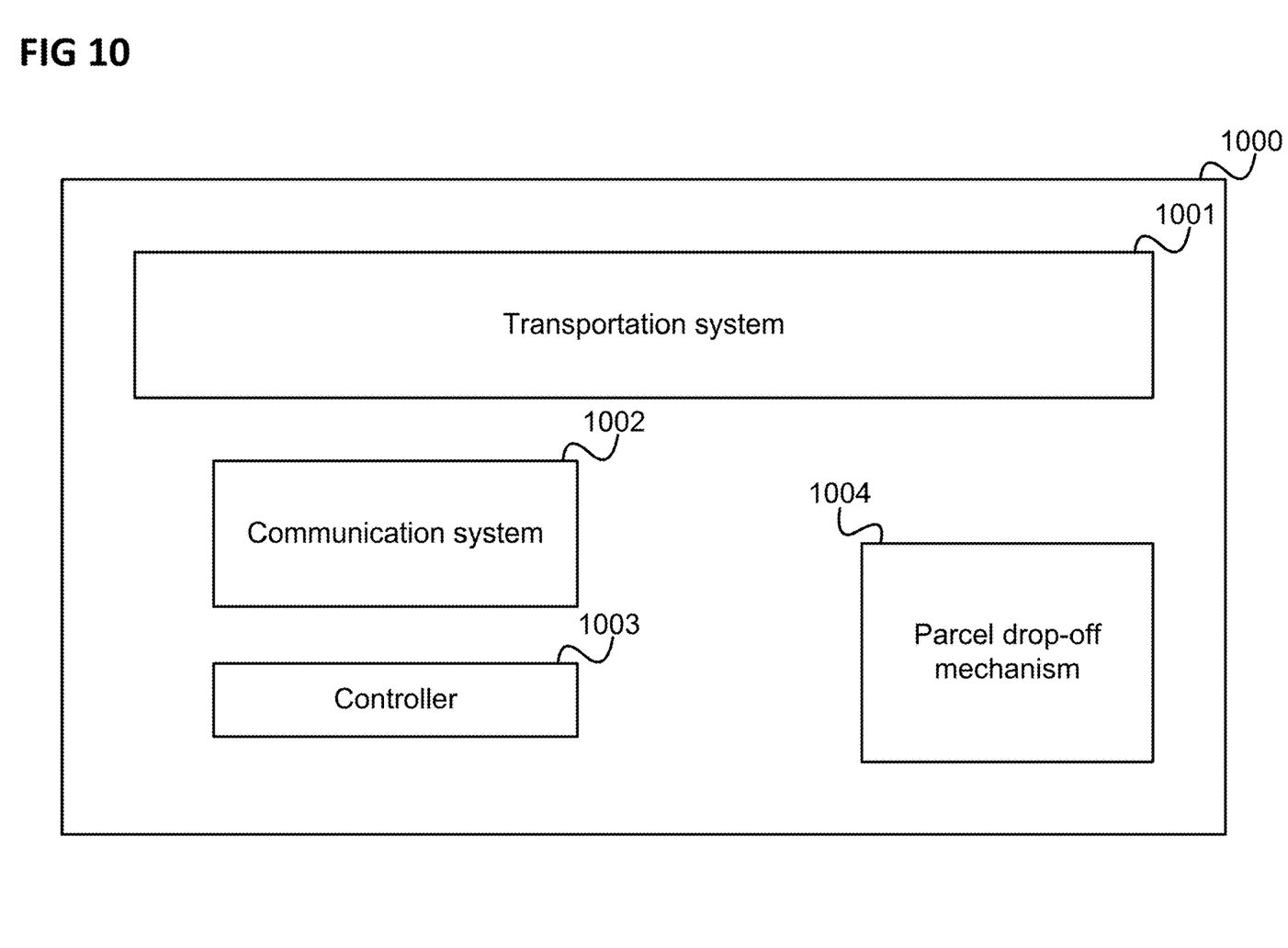
FIG. 10 shows an automated delivery device 1000 according to various examples.

FIG. 10 shows an automated delivery device 1000 according to various examples.

The automated delivery device 1000 includes a transportation system 1001 configured to move a package to a package recipient location and a communication system 1002 configured to communicate with a recipient ranging device at the package recipient location.

The automated delivery device 1000 further includes a controller 1003 configured to verify that the automated delivery device has moved to the correct package recipient location based on data received by the communication system from the recipient ranging device.

Further, the automated delivery device 1000 includes a package drop-off mechanism 1004 configured to drop off the package at the package recipient location if the automated delivery device has moved to the correct package recipient location.

Figure 11:
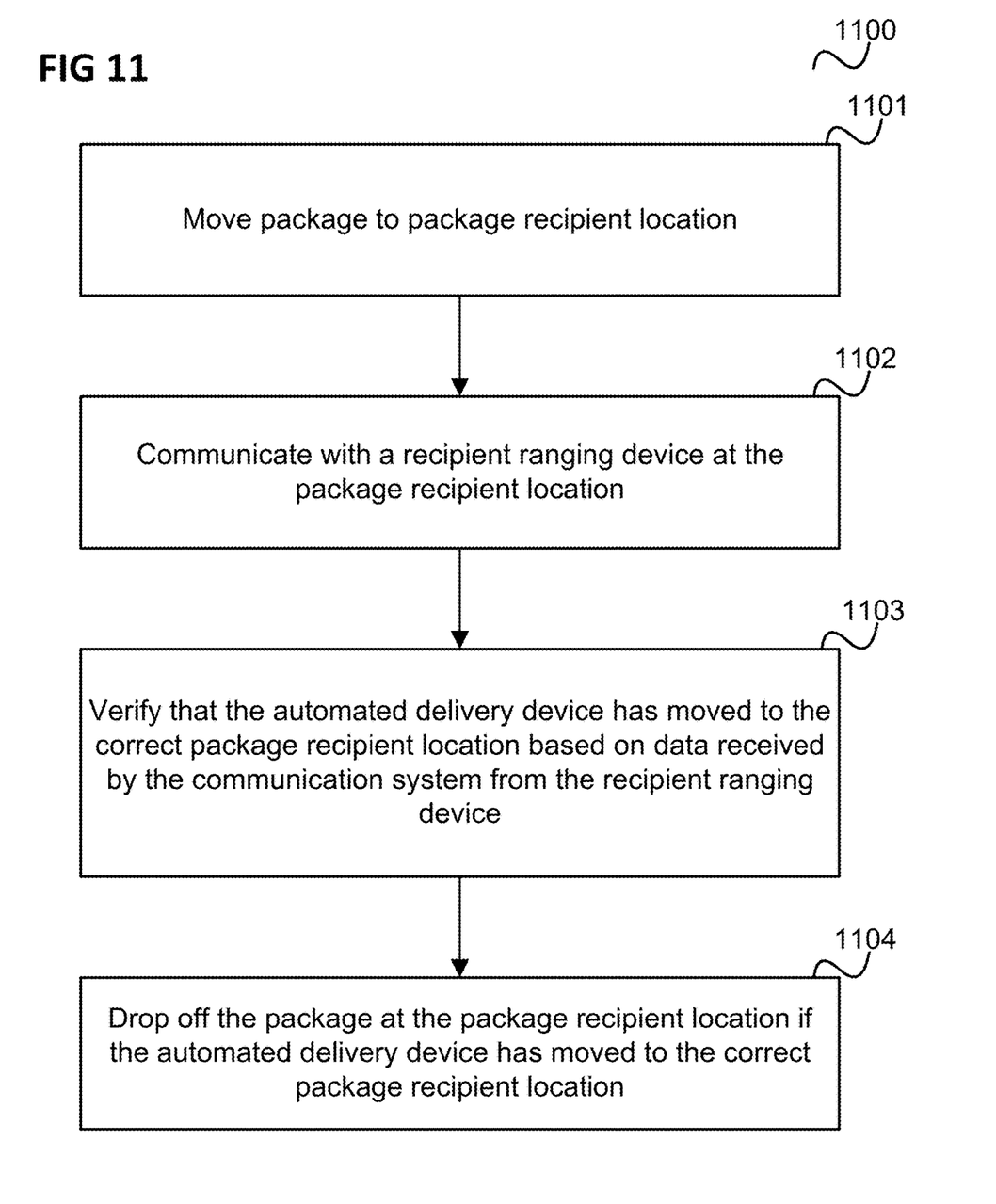
FIG. 11 shows a flow diagram 1100 illustrating a method for delivering a package, for example performed by an automated delivery device.

FIG. 11 shows a flow diagram 1100 illustrating a method for delivering a package, for example performed by an automated delivery device.

In 1101, the automated delivery device moves a package to a package recipient location.

In 1102, the automated delivery device communicates with a recipient ranging device at the package recipient location.

In 1103, the automated delivery device verifies that the automated delivery device has moved to the correct package recipient location based on data received by the communication system from the recipient ranging device.

In 1004, the automated delivery device drops off the package at the package recipient location if the automated delivery device has moved to the correct package recipient location.

The following examples pertain to further exemplary implementations.

Example 1 is an automated delivery device as illustrated in FIG. 8.

In Example 2, the subject-matter of Example 1 may optionally include a further camera system configured to obtain a further image of the delivered package.

In Example 3, the subject-matter of Example 2 may optionally include the controller being configured to upload the further image to a delivery verification server.

In Example 4, the subject-matter of any one of Examples 2-3 may optionally include the controller being configured to upload the further image to a delivery verification server with a timestamp of the drop off of the package.

In Example 5, the subject-matter of any one of Examples 1-4 may optionally include the communication system being radio system.

In Example 6, the subject-matter of any one of Examples 1-5 may optionally include the communication system being configured to communicate with a recipient ranging device and the controller being configured to verify that the automated delivery device has moved to the correct package recipient location based on data received by the communication system from the recipient ranging device.

In Example 7, the subject-matter of Example 6 may optionally include the recipient ranging device being a beacon device.

In Example 8, the subject-matter of any one of Examples 1-7 may optionally include the communication system being configured to communicate with a recipient authentication device and the controller being configured to verify that the automated delivery device has moved to the correct package recipient location based on data received by the communication system from the recipient authentication device.

In Example 9, the subject-matter of Example 8 may optionally include the controller being configured to verify that the automated delivery device has moved to the correct package recipient location based on a verification that the recipient authentication device has possession about a previously negotiated token.

In Example 10, the subject-matter of any one of Examples 1-9 may optionally include the controller being configured to instruct the recipient camera device to obtain the image of the delivered package and upload it to a delivery verification server.

In Example 11, the subject-matter of any one of Examples 1-10 may optionally include the controller being configured to instruct the recipient camera device to obtain the image of the delivered package and transmit it to the automated delivery device.

In Example 12, the subject-matter of any one of Examples 1-11 may optionally include the delivery device being an unmanned aerial vehicle.

In Example 13, the subject-matter of any one of Examples 1-12 may optionally include the controller being implemented by a secure embedded controller.

Example 14 is a method for delivering a package as illustrated in FIG. 9.

In Example 15, the subject-matter of Example 14 may optionally include the package being moved to the package recipient location by means of an automated delivery device and obtaining a further image of the delivered package by means of a camera of the automated delivery device.

In Example 16, the subject-matter of Example 15 may optionally include uploading the further image to a delivery verification server.

In Example 17, the subject-matter of any one of Examples 15-16 may optionally include uploading the further image to a delivery verification server with a timestamp of the drop off of the package.

In Example 18, the subject-matter of any one of Examples 14-17 may optionally include communicating with the recipient camera device by means of a radio system.

In Example 19, the subject-matter of any one of Examples 14-18 may optionally include communicating with a recipient ranging device and verifying that the package has been moved to the correct package recipient location based on data received by the communication system from the recipient ranging device.

In Example 20, the subject-matter of Example 19 may optionally include the recipient ranging device being a beacon device.

In Example 21, the subject-matter of any one of Examples 14-20 may optionally include communicating with a recipient authentication device and verifying that the package has been moved to the correct package recipient location based on data received by the communication system from the recipient authentication device.

In Example 22, the subject-matter of Example 21 may optionally include verifying that the package has been moved to the correct package recipient location based on a verification that the recipient authentication device has possession about a previously negotiated token.

In Example 23, the subject-matter of any one of Examples 14-22 may optionally include instructing the recipient camera device to obtain the image of the delivered package and upload it to a delivery verification server.

In Example 24, the subject-matter of any one of Examples 14-23 may optionally include the package being moved to the package recipient location by means of an automated delivery device and instructing the recipient camera device to obtain the image of the delivered package and transmit it to the automated delivery device.

In Example 25, the subject-matter of any one of Examples 14-24 may optionally include the package being moved to the package recipient location by means of an unmanned aerial vehicle.

In Example 26, the subject-matter of any one of Examples 14-25 may optionally include instructing of the recipient camera device to verify package delivery based on an image of the delivered package being performed by a secure embedded controller.

Example 27 is an automated delivery device as illustrated in FIG. 10.

In Example 28, the subject-matter of Example 27 may optionally include the communication system being radio system.

In Example 29, the subject-matter of any one of Examples 27-28 may optionally include the recipient ranging device being a beacon device.

In Example 30, the subject-matter of any one of Examples 27-29 may optionally include the recipient ranging device comprising a recipient authentication device and the controller being configured to verify that the automated delivery device has moved to the correct package recipient location based on a verification that the recipient authentication device has possession about a previously negotiated token.

In Example 31, the subject-matter of any one of Examples 27-30 may optionally include the delivery device being an unmanned aerial vehicle.

In Example 32, the subject-matter of any one of Examples 27-31 may optionally include the controller being implemented by a secure embedded controller.

Example 33 is a method for delivering a package as illustrated in FIG. 11.

In Example 34, the subject-matter of Example 33 may optionally include communicating with the recipient ranging device by means of a radio system.

In Example 35, the subject-matter of any one of Examples 33-34 may optionally include the recipient ranging device being a beacon device.

In Example 36, the subject-matter of any one of Examples 33-35 may optionally include the recipient ranging device comprising a recipient authentication device and verifying that the automated delivery device has moved to the correct package recipient location based on a verification that the recipient authentication device has possession about a previously negotiated token.

In Example 37, the subject-matter of any one of Examples 33-36 may optionally include the package being moved to the package recipient location by means of an unmanned aerial vehicle.

In Example 38, the subject-matter of any one of Examples 33-37 may optionally include the verifying being performed by a secure embedded controller.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. An automated delivery device comprising:
    a transportation system configured to move a package to a package recipient location;
    a package drop-off mechanism configured to drop off the package at the package recipient location;
    a communication system configured to communicate with a recipient camera device at the package recipient location; and
    a controller configured to instruct the recipient camera device via the communication system to obtain the image of the delivered package and transmit it to the automated delivery device.

2. The automated delivery device of claim 1, comprising a further camera system configured to obtain a further image of the delivered package.

3. The automated delivery device of claim 2, wherein the controller is configured to upload the further image to a delivery verification server.

4. The automated delivery device of claim 2, wherein the controller is configured to upload the further image to a delivery verification server with a timestamp of the drop off of the package.

5. The automated delivery device of claim 1, wherein the communication system is radio system.

6. The automated delivery device of claim 1, wherein the communication system is configured to communicate with a recipient ranging device and wherein the controller is configured to verify that the automated delivery device has moved to a correct package recipient location based on data received by the communication system from the recipient ranging device.

7. The automated delivery device of claim 6, wherein the recipient ranging device is a beacon device.

8. The automated delivery device of claim 1, wherein the communication system is configured to communicate with a recipient authentication device and wherein the controller is configured to verify that the automated delivery device has moved to a correct package recipient location based on data received by the communication system from the recipient authentication device.

9. The automated delivery device of claim 8, wherein the controller is configured to verify that the automated delivery device has moved to the correct package recipient location based on a verification that the recipient authentication device has possession about a previously negotiated token.

10. The automated delivery device of claim 1, wherein the controller is configured to instruct the recipient camera device to obtain the image of the delivered package and upload it to a delivery verification server.

11. The automated delivery device of claim 1, wherein the automated delivery device is an unmanned aerial vehicle.

12. The automated delivery device of claim 1, wherein the controller is implemented by a secure embedded controller.

13. A method of delivering a package with an unmanned aerial vehicle, comprising:
    moving a package to a package recipient location via a transportation system that is part of the unmanned aerial vehicle;
    dropping off the package at the package recipient location via a package drop-off mechanism that is part of the unmanned aerial vehicle;
    communicating from the unmanned aerial vehicle to a recipient camera device at the package recipient location;
    wirelessly sending an instruction from the unmanned aerial vehicle to the recipient camera device to obtain an image of the delivered package; and
    receiving, by the unmanned aerial vehicle, the image of the delivered package from the recipient camera device.

14. The method of claim 13, wherein the package is moved to the package recipient location by means of an automated delivery device and the method comprises obtaining a further image of the delivered package by means of a camera of the automated delivery device.

15. The method of claim 14, comprising uploading the further image to a delivery verification server.

16. The method of claim 14, comprising uploading the further image to a delivery verification server with a timestamp of the drop off of the package.

17. The method of claim 13, comprising communicating with the recipient camera device by means of a radio system.

* * * * *